United States Patent
Chang

(10) Patent No.: US 7,286,267 B2
(45) Date of Patent: Oct. 23, 2007

(54) METHOD FOR RENDERING AN IMAGE COMPRISING MULTI-LEVEL PIXELS

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 11/359,147

(22) Filed: Feb. 21, 2006

(65) Prior Publication Data

US 2006/0139695 A1 Jun. 29, 2006

Related U.S. Application Data

(63) Continuation of application No. 09/955,498, filed on Sep. 17, 2001, now Pat. No. 7,102,789.

(51) Int. Cl.
*G06K 15/00* (2006.01)

(52) U.S. Cl. .................. 358/3.1; 358/3.06; 358/1.12

(58) Field of Classification Search ............... 358/3.06, 358/3.09, 3.1, 3.11, 3.12, 3.13, 3.2, 3.3, 1.12
See application file for complete search history.

(56) References Cited

U.S. PATENT DOCUMENTS

| 5,212,518 | A  | * | 5/1993 | Numakura et al. ........... 355/77 |
| 6,208,749 | B1 | * | 3/2001 | Gutkowicz-Krusin et al. ... 382/128 |
| 6,269,183 | B1 | * | 7/2001 | Matoba et al. .............. 382/166 |
| 6,370,265 | B1 | * | 4/2002 | Bell et al. .................. 382/132 |
| 6,683,975 | B2 | * | 1/2004 | Wang et al. ................. 382/141 |
| 6,876,384 | B1 | * | 4/2005 | Hubina et al. ............. 348/223.1 |

* cited by examiner

*Primary Examiner*—Jerome Grant, II
(74) *Attorney, Agent, or Firm*—Chernoff, Vilhauer, McClung & Stenzel

(57) ABSTRACT

A halftoning method utilizes staged, overlapping pixel intensity growth in a halftone cell in rendering a halftone image with multi-level pixels.

13 Claims, 5 Drawing Sheets

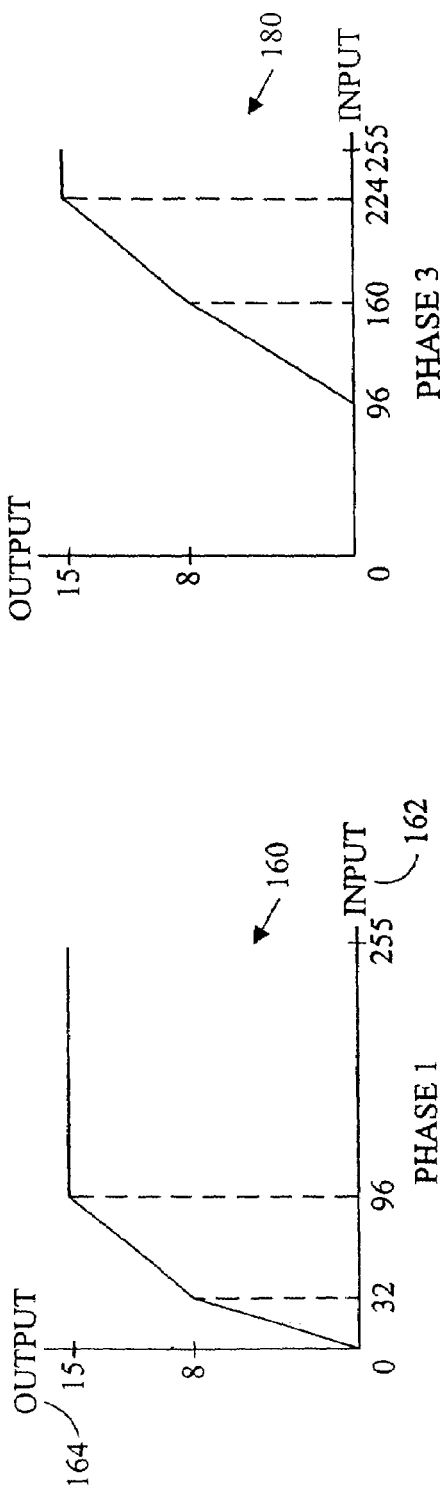
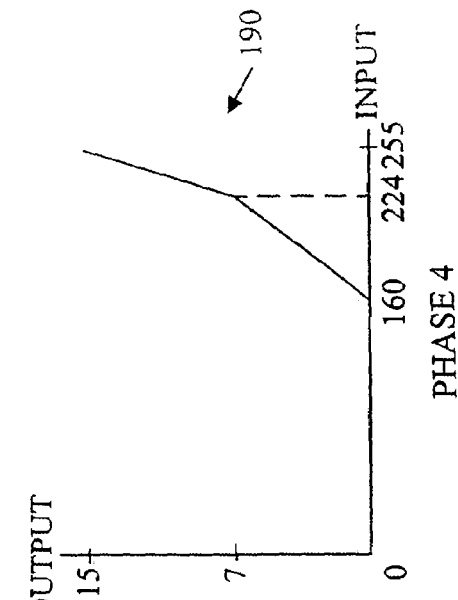
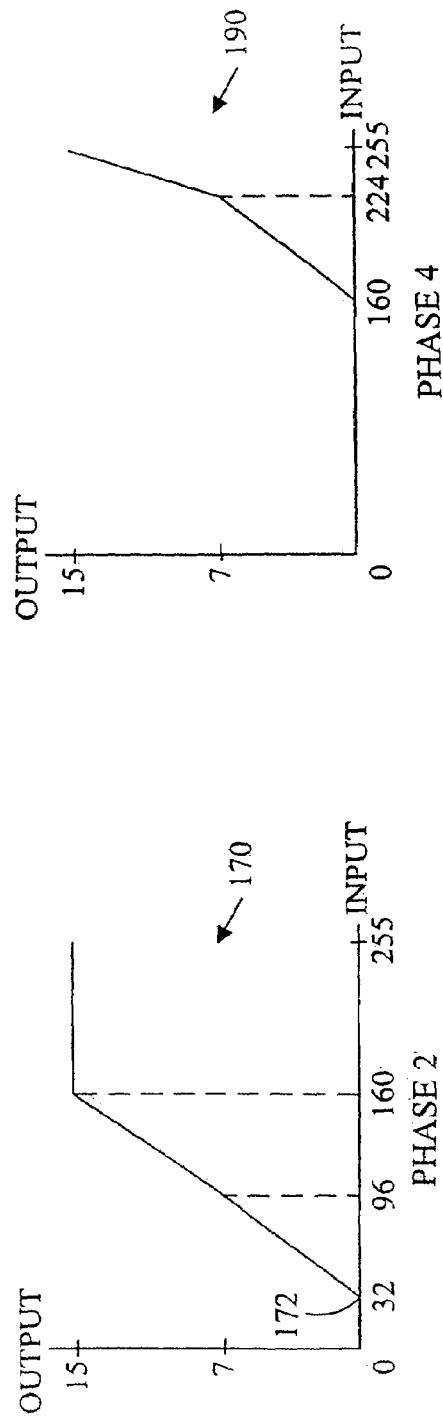

METHOD FOR RENDERING AN IMAGE COMPRISING MULTI-LEVEL PIXELS

CROSS-REFERENCE TO RELATED APPLICATIONS

This application is a continuation of U.S. patent application Ser. No. 09/955,498, filed Sep. 17, 2001 now U.S. Pat. No. 7,102,789.

BACKGROUND OF THE INVENTION

The present invention relates to image processing and, more particularly, to a method for rendering an image comprising pixels renderable at one of a plurality of intensity levels.

Typically, digital images are stored and processed as an array of picture elements or pixels. Each pixel represents the intensity of the image when sampled at a set of spatial coordinates defined by a grid that virtually overlays the image. The analog signal obtained by sampling the image at the pixel's location is quantized to a discrete value known as a gray scale level that is proportional to the amplitude of the intensity or reflectance of the sample. In the case of a monochrome image, the gray scale value of a pixel is a quantized scalar representation of the intensity. On the other hand, the value of a pixel of a color image is a vector representing the combined intensities of a plurality of component colors (for example, red, green, and blue) of the pixel. A color image is, in effect, a plurality of superimposed gray scale images where the intensity of a pixel of one of the gray scale images represents the intensity of a component color at the pixel's location.

The human visual system can resolve approximately 200 levels of intensity and image sampling devices and processes, such as scanners, cameras, and computer graphics programs, commonly resolve intensity to 256 or more levels. With 256 levels of intensity resolution for each of three color components, one of approximately 16.7 million colors can be specified for each pixel of a color image. Images comprising pixels specified with such fine resolution are known as continuous tone images, even though the possible values of pixel intensity vary by finite, non-zero amounts.

In contrast to the fine resolution that can be quantified by a typical image sampling device or process, image display devices can produce pixels with very few intensity levels. For example, a bi-tonal printer can deposit or not deposit ink at a pixel location to render the pixel either black (or one of the component colors) or white. On the other hand, some display devices are capable of producing pixels with a plurality of intensity levels, increasing the diversity of pixel intensity in the displayed image. For example, some printers are capable of varying the size of the dot deposited or selecting among a plurality of shades of printing medium to deposit at a pixel and some cathode ray tube (CRT) displays can display several pixel intensities by altering the strength of the electron beam incident upon the phosphor at the pixel location. However, the number of intensity levels that can be displayed by most display devices is very limited compared to the large number of levels that can be captured by sampling an image.

Techniques known generally as digital halftoning are used to produce images that have the appearance of a continuous tone image even though the pixels of the halftone image are rendered with relatively few levels of resolution compared to the resolution of the sampled continuous tone image. Generally, digital halftoning is a technique that outputs an image that is subdivided into a plurality of areas known as halftone cells. The halftone cells contain a number dots that are arranged and rendered such that the halftone cell will be perceived by a viewer to have a gray scale intensity commensurate with that of the corresponding area of a continuous tone image.

The process of mapping the intensity samples or input pixels from areas of a continuous tone image to an arrangement of dots comprising one or device pixels in a halftone cell is known as spatial modulation. Spatial modulation is accomplished by dithering, a process of comparing a quantized gray scale intensity of an input pixel to an entry in a matrix of modulation levels that typically includes an entry for each pixel of the halftone cell. In bi-tonal halftoning, if the intensity of the input pixel exceeds the modulation level, a signal is sent to the printer or other display device and a dot is created (for example, ink is deposited) in the output image at a location corresponding to the pixel's location in the input image. If the intensity value is less than the modulation level, a dot is not created at the pixel. The matrix comparison process is repeated for each input pixel from the continuous tone image. As a result, the continuous tone input image is converted to a halftone image comprising a tile-like arrangement of multiple dot, halftone cells which are intended to be perceptually equivalent to corresponding areas of the continuous tone image. To create a color image, the interlaced color data representing an image sample is separated into the data representing each individual color component (typically red, green, and blue or cyan, magenta, yellow, and black) and the halftoning process is repeated for each color component of each image pixel. The halftone images for each of the color components are overlaid to create the halftone color image.

Multi-level halftoning is an extension of bi-tonal halftoning in which the output dot or pixel is rendered at one of the several available intensity levels rather than the two levels (ON or OFF, INK or NO INK) available with bi-tonal halftoning. If a display device can accurately display five levels of intensity at a device pixel or dot, the multi-level halftoning system simulates the appearance of an area of a continuous tone image by distributing in a halftone cell a plurality of dots, each having one of five possible intensity levels. The bi-tonal dithering process is extended to determine the appropriate intensity level of the multi-level output dot or device pixel. The intensity of the input sample is compared to an entry in each of N−1 modulation level matrices, where N is the number of available output intensity levels for the device pixel. The output of each comparison is represented by a digital bit having a value of either logical "1" if the input intensity is greater than the modulation level or logical "0" if the input intensity is less than the modulation level. Each output bit is stored in an intermediate matrix that is, in essence, a bi-tonal halftone cell. The elements of the intermediate matrix are combined to form a multi-bit value that is encoded to select one of the available output intensity levels for the multi-level device pixel or dot to be rendered in the halftone cell. To reduce the computation required for halftoning with multi-level pixels, the results of coding of the several comparisons can be captured in a transfer function that is selected by the input sample location and which yields an output intensity level corresponding to an intensity of an input sample.

While multi-level dots or device pixels increase the diversity of the dots in the output halftone cell, potentially facilitating more faithful reproduction of the appearance of a continuous tone image, the strategies for intensity change or growth of multi-level pixels have generally been an extension of the intensity growth of bi-tonal pixels and produce less than optimal results. Multi-level pixel intensity growth has followed either a hard dot or soft dot strategy. In the hard dot strategy, a second dot or pixel is not printed (the pixel's intensity is not increased from the minimum level) unless the intensity of a first dot or pixel in the cell is at the maximum level. Following the soft dot strategy, the intensities of a plurality of pixels grow simultaneously to increase the intensity of the halftone cell. The hard dot strategy produces sharper images with higher contrast than the soft dot strategy, but images created with the soft dot growth strategy are more detailed than images produced with the hard dot strategy.

What is desired, therefore, is a method for rendering multi-level pixels in a halftone cell to produce an image having the appearance and the detail of a continuous tone image.

BRIEF DESCRIPTION OF THE SEVERAL VIEWS OF THE DRAWINGS

FIG. 6 is a graphical representation of an exemplary transfer function relating an intensity of a sample to an intensity level of a multi-level pixel.

FIG. 7 is a graphical representation of an exemplary transfer function relating an intensity of a sample to an intensity level of a multi-level pixel.

FIG. 8 is a graphical representation of an exemplary transfer function relating an intensity of a sample to an intensity level of a multi-level pixel.

FIG. 9 is a graphical representation of an exemplary transfer function relating an intensity of a sample to an intensity level of a multi-level pixel.

DETAILED DESCRIPTION OF PREFERRED EMBODIMENT

Figure 1:
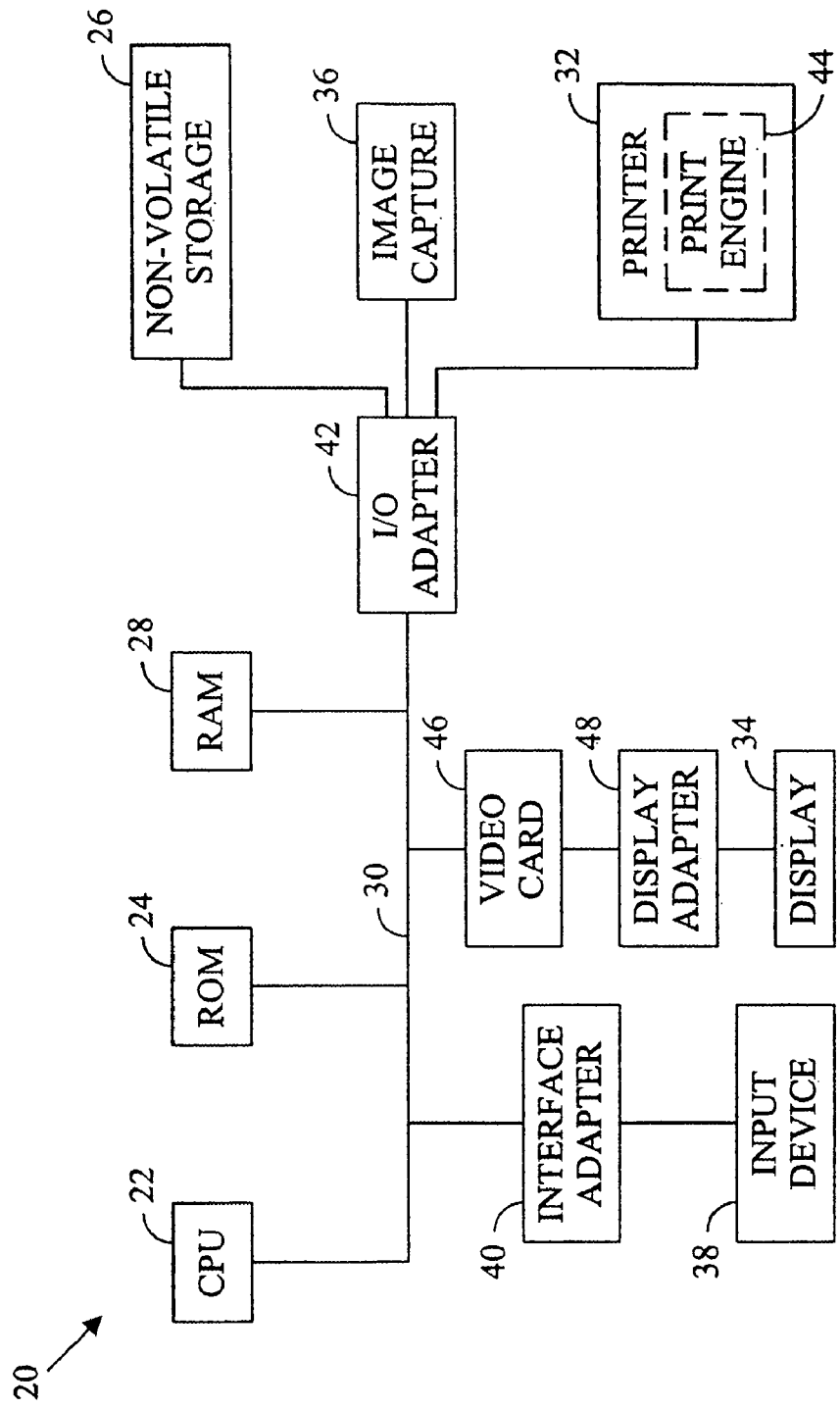
FIG. 1 is a block diagram of a computer system.

FIG. 1 depicts an exemplary personal computer system 20 useful for digital image processing. While the personal computer system may have many configurations, the exemplary computer includes a microprocessor-based, central processing unit (CPU) 22 that fetches data and instructions from a plurality of sources, processes the data according to the instructions, and stores the result or transmits the result in the form of instructions to control some attached device. Typically, basic operating instructions used by the CPU 22 are stored in nonvolatile storage, such as read only memory (ROM) 24. Application programs and data are typically stored on a nonvolatile mass storage device 26, such as a disk storage unit. The data and instructions are typically transferred from the mass storage device 26 to random access memory (RAM) 28 and fetched from RAM by the CPU 22. Data and instructions are typically transferred between the CPU 24, ROM 24, and RAM 28 over an internal bus 30.

The exemplary computer system 20 also includes several attached devices, including a printer 32; a display 34; an image capture device 36, such as a camera or scanner; and an input device 38, such as a keyboard. Data is transmitted to and received from each of the attached devices by the CPU 22 by a communication channel connected to the internal bus 30. Typically, each device is attached to the internal bus by way of an adapter, such as the interface adapter 40 providing an interface between the input device 38 and the internal bus 30. The printer 32, image capture device 36, and nonvolatile mass storage device 26 are connected to the internal bus 30 by an input-output (I/O) adapter 42.

The printer 32 outputs device pixels or dots of printing medium, such as ink, dye, or toner, that are mapped into a rectangular array or raster. A print engine 44 of the printer 32 receives low level instructions from the CPU 22 specifying which device pixels of the raster are to receive the printing medium. The print engine 44 is capable of producing device pixels or dots having a plurality of intensity values (multi-level pixels) ranging from a minimum intensity (no printing medium) to a maximum intensity. Exemplary methods of varying the intensity of multi-level pixels include varying the size of the device pixel deposited or selecting among printing media of differing tones or shades. The magnitude of the instruction from the CPU 22 selects the intensity level of the pixel rendered by the print engine 44.

Likewise, the CPU 22 provides data to a video card or engine 46 which generates an output signal to the display 34 which connected to the video card by the display adapter 48. The intensity of a pixel produced on the display 34 can be varied by varying the signals generated by the video card 40. For example, the voltage of the electron beam striking the phosphors at a pixel location can be varied to alter the intensity of a pixel displayed on a CRT tube used in a display.

Even though the printer 32 and display 34 are capable of displaying multi-level pixels, the resolution of the displayed pixels is typically much coarser than the resolution necessary to display a continuous tone image. For example, a printer may be able to display pixels with up to 16 intensity levels, but the pixels of continuous tone images are typically resolved to 256 or more levels. Digital halftoning is used to create a displayed image that will be visually perceived to be substantially equivalent to a continuous tone image even though the pixels of the displayed image are rendered with far fewer levels of resolution than the pixels of a continuous tone image. The displayed halftone image comprises a tile-like arrangement of halftone cells, each containing a plurality of dots or device pixels that are arranged and rendered such that the perceived intensity of the halftone cell will be commensurate with the corresponding area of the continuous tone image.

Figure 2:
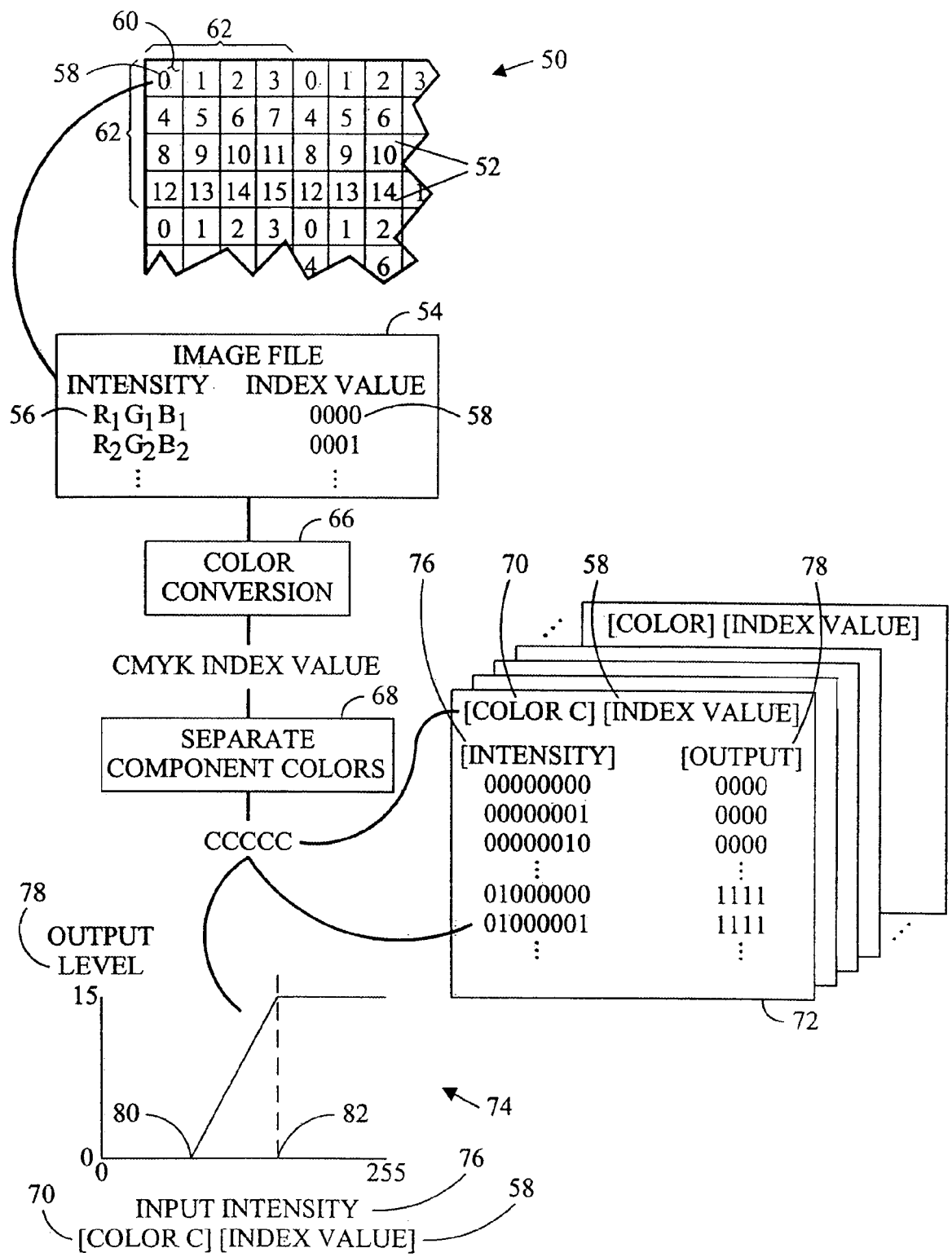
FIG. 2 is a pictorial representation of a digital halftoning technique.

Referring to FIG. 2, for halftoning, a continuous tone input image 50 is dissociated into a plurality of samples or pixels 52 arranged in a rectangular array or raster. The analog signal for each sample or pixel 52 of the input image 50 is quantized and digitized and typically stored in an image file 54 on a mass storage device 26. The samples of the input image are typically obtained by an image capture device 36, such as a scanner or camera, or from a computer graphics program. A color image is further decomposed into plurality of superimposed color planes, each plane describing the intensity one of the component colors (typically, red, green, and blue) making up the pixels of the image. If the input samples are initially obtained by an image capture device, the color decomposition is typically accomplished by filtering. On the other hand, the pixels of an image created with a computer graphics program are typically described by their component colors at creation. A color image is constructed by superimposing the color planes for three (typically, red, green, and blue) or four (typically, cyan, magenta, yellow, and black) component colors. The data describing a pixel 56 is typically stored in an image file 54 as a single value in which the intensities of the individual component colors (RGB) are interlaced.

FIG. 2 pictorially illustrates an exemplary halftoning technique in which each sample of the input image, for example, pixel value 56, in the image file 54 is associated with an index value 58 expressing the position of the pixel 60 in one of a plurality of pixel matrices 62 (indicated by brackets) that are virtually overlaid on the continuous tone image 50. The pixel matrix 62 typically comprises a number of pixels of the continuous tone image corresponding to the number of device pixels in the halftone cell. If the multi-level output device, for example printer 32, can resolve the intensity of the device pixels output by the device to 16 levels (4 bit capable multi-level rendering), the pixel matrix comprises 16 elements corresponding to the 16 device pixels included in a halftone cell. As the data for each input sample is read into the image file 54, the CPU 22 associates an index value 58 with the sample data 56 to indicate the position of the corresponding sample or input pixel in the pixel matrix.

The interlaced data for a sample 56 is disassociated into the intensities of the component colors and the color component data is converted 66, if necessary, to the data describing the component colors of the color space in use by the output device. The color component data is aggregated into streams of data describing the intensities of each of the component colors of the samples 68. A component color 70 and the index matrix value 58 associated with a sample is used to select one of a plurality of rendering tables 72 or transfer functions 74 relating the intensity of an input sample 76 and an output intensity level 78 for the pixel to be rendered. A transfer function 74 generally maps a tone reproduction curve for a pixel rendering engine, such as the print engine 44, onto a range of input sample intensities 76 to produce the desired intensity levels 78 for the rendered pixels. A typical transfer function comprises, generally, three sections (indicated generally by brackets). At input intensities less than an initial threshold 80 the printing medium is not deposited at the pixel and its intensity level is at a minimum level. The input intensity of the initial threshold 80 may be "zero" if the pixel is to receive printing medium at very low levels of input intensity. At input intensities greater than the initial threshold 80, the intensity of the pixel will be increased. Initially, the change in input 76 and output 78 intensities or pixel growth follows generally a ramp function as the tone reproduction curve of the pixel rendering engine is mapped on the pixel intensities. Typically, the pixel growth continues until the maximum output intensity is reached at an upper threshold of input intensity 82. If the index value 58 selects a transfer function for a pixel that grows later than other pixels in the halftone cell, the upper threshold may equal the maximum input intensity (255 in the example). When the color 70 and index value 58 select an appropriate transfer function, the CPU 22 uses the transfer function to calculate an output level 78 for the rendered pixel corresponding to the input intensity 76 of the sample from the continuous tone image.

Since the input and output intensities are integer numbers, the transfer functions 74 can be represented by a series of data points rather than continuous functions, and the corresponding input and output intensities for each of the data points can be captured in a rendering table 72. The index number 58 is used by the CPU 22 to select one of the rendering tables associated with the color component 70 and the input intensity 76 selects a corresponding output level 78 from the table.

In the design of an image processing system, the designer selects corresponding input intensity values and output levels with the objective of producing a halftone cell that is visually perceived to have substantially equivalent intensity to a corresponding area on a continuous tone image. Multi-level pixels permit a greater diversity of pixel intensity within the halftone cell than do bi-tonal pixels which are either at the maximum intensity or the minimum intensity levels. However, the strategy utilized in varying the intensities of the pixels of the halftone cell influences the quality of the output image. Typically, the intensity change or growth of pixels in a halftone cell has followed either a hard dot or soft dot strategy. In the hard dot strategy, a second pixel does not receive printing medium (the pixel intensity does not grow) until the input intensity for a first pixel has reached the upper threshold so that the first pixel will be rendered at the maximum intensity. In a soft dot strategy, the pixels of the halftone cell share a common transfer function and the intensity of all pixels grow simultaneously to increase the average intensity of the halftone cell. Neither the hard dot strategy nor the soft dot strategy is optimal in creating high quality halftone images. The hard dot strategy produces images with higher contrast than the soft dot strategy, but images created with the soft dot intensity growth strategy include more detail than images produced with the hard dot strategy.

Figure 3:
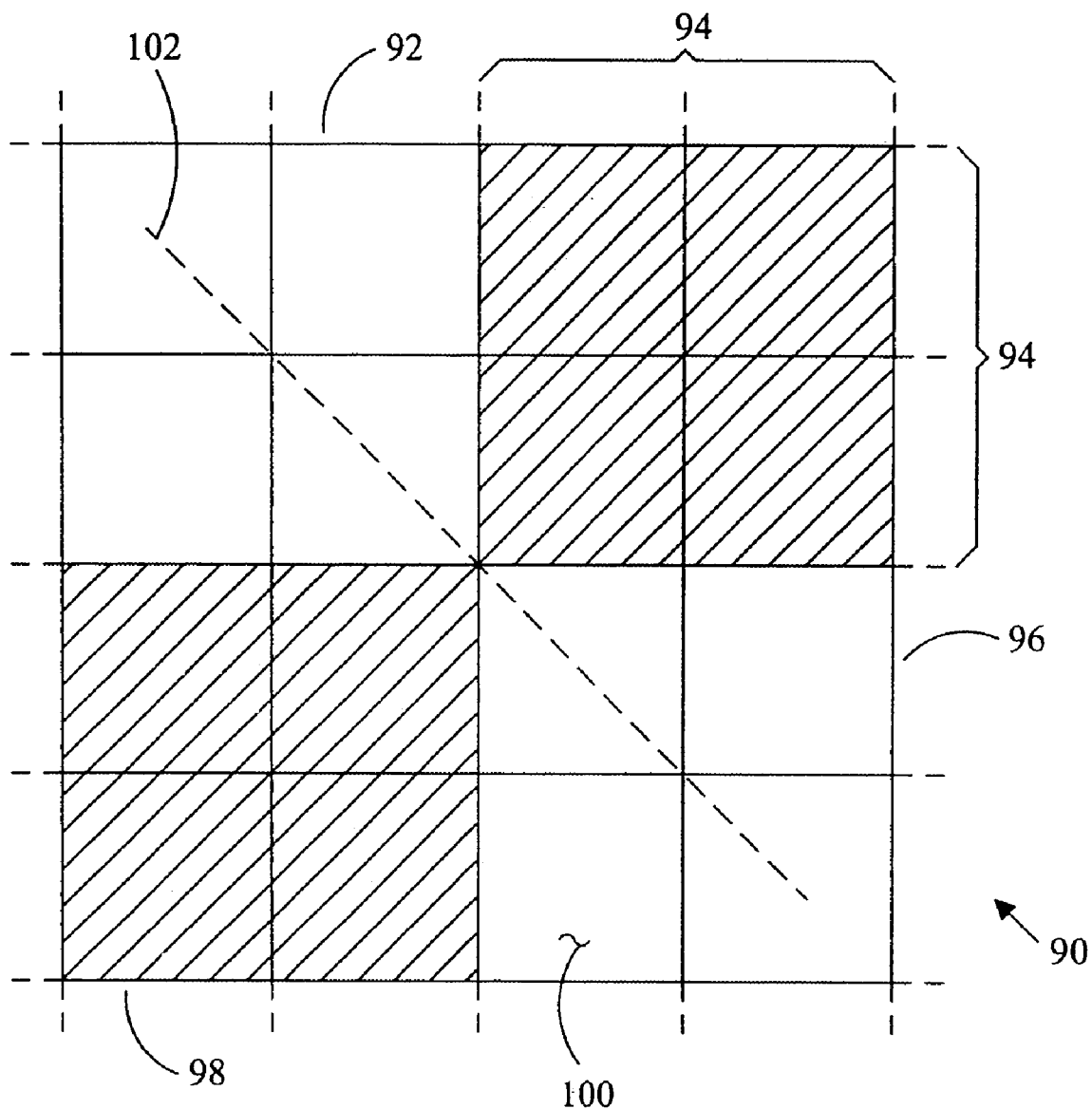
FIG. 3 is a pictorial representation of a double dot halftone cell.

Referring to FIG. 3, a third pixel intensity growth strategy that seeks to obtain benefits of both the soft and hard growth strategies is the double dot strategy. Each halftone cell 90 is subdivided into four dots 92, 94 (indicated by brackets), 96, and 98 comprising a plurality of device pixels 100. The intensities of the pixels within each dot and the intensities of the two diagonally opposed dots 94 and 98 are increased simultaneously in a soft dot strategy. However, the intensity growth between the two pairs of dots (94 and 98) and (92 and 96) follows a hard dot strategy. The mixture of hard dot and soft dot strategies improves the contrast of the halftone image while preserving more of the image details. In addition, the diagonal arrangement of dots of similar intensity in the halftone cell 90 creates a 45-degree screen that is visually pleasing. While the double dot pixel growth strategy is beneficial, details that are oriented substantially normal to the alignment of the dots in the cell, such as the line 102, are rendered poorly by the double dot technique. The present inventor realized that a strategy of overlapping intensity growth between high frequency dots in a halftone cell would produce a halftone image with greater contrast and improved detail than could be achieved with any of the hard dot, soft dot, and double dot growth strategies.

Figures 4, 5:
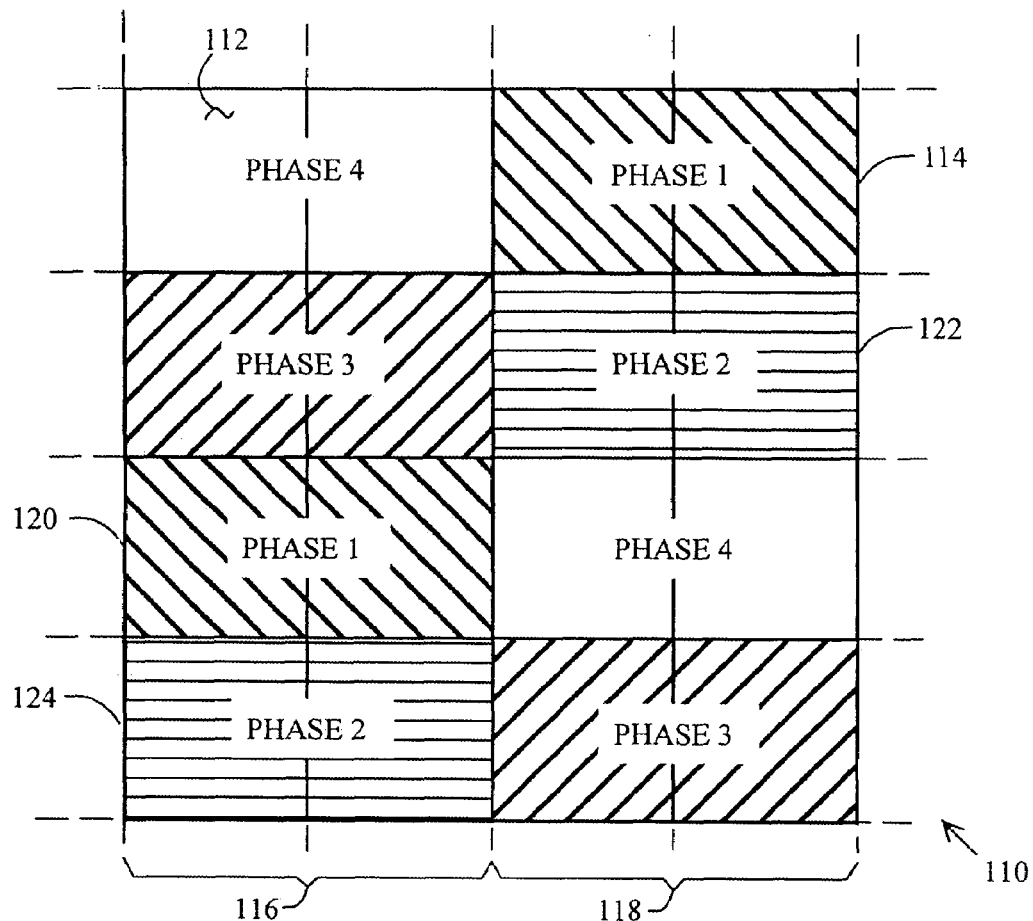
FIG. 4 is a schematic representation of a halftone cell according to the present invention.
FIG. 5 is a tabular representation of intensity growth from pixels of the halftone cell of FIG. 4.

Referring to FIG. 4, in the halftone method of the present invention, a halftone cell 110 comprising a rectangular array of multi-level device pixels 112 is divided into a plurality of dots 114 comprising at least one device pixel. The 4 pixel×4 pixel halftone cell 110 comprises two columns 116 and 118 (indicated by brackets) of four dots. A soft dot intensity growth strategy (utilizing substantially the same transfer function) is followed for pixels included in a dot. In addition, two dots, for example 114 and 120, that are displaced vertically and horizontally from each other comprise a phase (for example, phase 1) and a soft dot strategy is followed for the dots of the phase. Simultaneous intensity growth for the vertically and horizontally offset dots (for example, 114 and 120) of a phase (for example, phase 1) facilitates the visual attractiveness of a diagonal screen.

To improve the contrast of the output image while capturing details from the continuous tone image, a staged, overlapping intensity growth strategy is utilized between phases. Referring to FIG. 5, in a first stage of growth 150, the output level of the pixels of a first phase 152 are allowed to increase to approximately one-half the maximum intensity before the intensity of pixels of a second phase 154 begin to increase in intensity. If the exemplary transfer function 160 of FIG. 6 describes the input 162 and output 164 of exemplary phase 1 dots, the intensity level of phase 1 pixels will exceed the minimum level for input intensities exceeding "zero." However, pixels of phase 2, for example, dots 122 and 124, to increase in intensity until the corresponding pixel of the continuous tone image reaches an intensity level of 32, the minimum threshold 172 of the transfer function 170 illustrated in FIG. 7. As illustrated in FIG. 5, during stage 2 (160), the intensities of phase 1 pixels 152 will be at levels between 9 and 15 while the intensities of phase 2 pixels will be at levels between 1 and 7. At stage 3 (164), the intensities of pixels of phase 1 will be at the maximum level and additional intensity for the halftone cell 110 will be obtained by increasing the levels of phase 2 pixels 154 and phase 3 pixels 156. Likewise, the intensity of the halftone cell is increased in stages 4 (164) and 5 (166) by the staged, overlapping growth of pixels of phases 3 (156) and 4 (158) as illustrated by their transfer functions 180, FIG. 8, and 190, FIG. 9, respectively. The overlapping intensity growth between phases provides a substantial difference in intensity between a plurality of dots for good contrast in the output image combined with a soft dot strategy over part of the output level to aid in capturing details. Overlapping growth between phases for approximately one half of the range of output levels maximizes the contrast and the range of soft intensity growth. In addition, the higher vertical frequency and the staged growth of phases prevents the loss of details aligned generally diagonally with the halftone cell.

The rendering method of the present invention optimizes the use of multi-level pixels for generating halftone images with high contrast and substantial detail.

The detailed description, above, sets forth numerous specific details to provide a thorough understanding of the present invention. In other instances, well known methods, procedures, components, and circuitry have not been described in detail to avoid obscuring the present invention. For the sake of convenience, operations are described as interconnected functional blocks or distinct software and/or hardware modules. However, those skilled in the art will appreciate that the present invention may be practiced without these specific details and that in many cases functional blocks or modules can be equivalently aggregated into a logic device, a program, or operation with differing or vague boundaries. In any event, the functional blocks and software and/or hardware modules, or described features may be implemented by themselves, or in combination with other operations in either hardware or software.

All the references cited herein are incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method of rendering a halftone cell of an image comprising a plurality of pixels and having a first number of pixel intensity levels, by halftoning, said method comprising the steps of:
    (a) rendering, on a printing device having a second number of pixel intensity levels less than said first number of pixel intensity levels, a visually perceptible first pixel at a first intensity based on a first transfer function for a first location; and
    (b) rendering on said printing device a visually perceptible second pixel at a second intensity based on a second transfer function for a second location, said second intensity being greater than a minimum intensity, less than a maximum intensity, and substantially different from said first intensity.

2. The method of claim 1 wherein said second pixel is displaced vertically and horizontally relative to said first pixel.

3. The method of claim 1 wherein said second intensity differs from said first intensity by approximately one half the difference between said maximum and said minimum intensities.

4. The method of claim 1 wherein said image is rendered on a display device, wherein the number of pixel intensity levels of said display device is less than the number of pixel intensity levels of a non-rendered said image.

5. A method of rendering a halftone cell of an image comprising an array of dots and having a first number of pixel intensity levels, by halftoning, a dot comprising a least one pixel, said method comprising the steps of:
    (a) rendering, on a printing device having a second number of pixel intensity levels less than said first number of pixel intensity levels, a visually perceptible first dot at a first intensity based on a first transfer function for a first location;
    (b) rendering on said printing device a visually perceptible second dot at substantially said first intensity based on said first transfer function for a second location, said second dot being displaced vertically and horizontally in said array from said first dot;
    (c) rendering on said printing device a visually perceptible third dot at a second intensity based on a second transfer function for third location, said second intensity being greater than a minimum intensity, less than a maximum intensity, and substantially different from said first intensity; and
    (d) rendering on said printing device a visually perceptible fourth dot at substantially said second intensity based on said second transfer function for a fourth location, said fourth dot being displaced vertically and horizontally relative to said third dot.

6. The method of claim 5 wherein said second intensity differs from said first intensity by approximately one half the difference between said maximum and said minimum intensities.

7. The method of claim 5 wherein said image is rendered on a display device, wherein the number of pixel intensity levels of said display device is less than the number of pixel intensity levels of a non-rendered said image.

8. A method of rendering an image by halftoning comprising a plurality of halftone cells, said method comprising the steps of:
    (a) sampling an intensity of an original image at a plurality of locations;
    (b) rendering a visually perceptible first pixel of a halftone cell at a first intensity in response to a first sample, said first intensity relating a first location and an intensity of said first sample based on a first transfer function for said first location; and (c) rendering a visually perceptible second pixel of said halftone cell at a second intensity in response to a second sample, said second intensity relating a second location and an intensity of said second sample based on said second transfer function for said second location and being greater than a minimum intensity, less than a maximum intensity, and substantially different from said first intensity.

9. The method of claim 8 wherein said second pixel is displaced vertically and horizontally relative to said first pixel in an array of pixels comprising of said halftone cell.

10. The method of claim 8 wherein the difference between said first and said second intensities is approximately one half of a difference between said minimum and said maximum intensities.

11. The method of claim 8 wherein the step of rendering a first pixel of a halftone cell at a first intensity in response to a first sample, said first intensity relating a location and an intensity of said first sample comprises the step of selecting a table according to said location of said sample, said table comprising an intensity of said sample and a corresponding intensity of said pixel.

12. The method of claim 8 wherein said image is rendered on a display device, wherein the number of pixel intensity levels of said display device is less than the number of pixel intensity levels of a non-rendered said image.

13. The method of claim 8 wherein said image is rendered on a printing device, wherein the number of pixel intensity levels of said printing device is less than the number of pixel intensity levels of a non-rendered said image.

* * * * *

UNITED STATES PATENT AND TRADEMARK OFFICE
CERTIFICATE OF CORRECTION

PATENT NO. : 7,286,267 B2 Page 1 of 1
APPLICATION NO. : 11/359147
DATED : October 23, 2007
INVENTOR(S) : Ching-Wei Chang It is certified that error appears in the above-identified patent and that said Letters Patent is hereby corrected as shown below:

Col. 2, line 9
Change "comprising one or device" to --comprising one or more device--.

Col. 3, line 63
Change "CPU 24" to --CPU 22--.

Col. 4, line 28
Change "which connected" to --which is connected--.

Col. 4, line 61
Change "plurality of superimposed" to --a plurality of superimposed--.

Col. 4, line 62
Change "intensity one of the" to --intensity of one of the--.

Col. 6, line 50
Change "inproved" to --improved--.

Col. 8, line 30
Change "comprising a least" to --comprising at least--.

Col. 8, line 44
Change "for third location" to --for a third location--.

Col. 9, line 14
Change "comprising of said" to --comprising said--.

Signed and Sealed this

Thirteenth Day of May, 2008

JON W. DUDAS
*Director of the United States Patent and Trademark Office*